(12) United States Patent
Abele et al.

(10) Patent No.: US 7,766,374 B2
(45) Date of Patent: Aug. 3, 2010

(54) VEHICLE OCCUPANT RESTRAINT DEVICE COMPRISING A GAS BAG

(75) Inventors: Timo Abele, Schwaebisch Gmuend (DE); Werner Freisler, Aalen (DE)

(73) Assignee: TRW Automotive GmbH, Alfdorf (DE)

( * ) Notice: Subject to any disclaimer, the term of this patent is extended or adjusted under 35 U.S.C. 154(b) by 479 days.

(21) Appl. No.: 11/788,898

(22) Filed: Apr. 23, 2007

(65) Prior Publication Data

US 2007/0246920 A1 Oct. 25, 2007

(30) Foreign Application Priority Data

Apr. 24, 2006 (DE) .................. 20 2006 006 550 U
Oct. 30, 2006 (DE) ...................... 10 2006 051 218

(51) Int. Cl.
*B60R 21/205* (2006.01)
*B60R 21/233* (2006.01)

(52) U.S. Cl. .................. 280/730.1; 280/732; 280/743.2

(58) Field of Classification Search ............... 280/743.1, 280/743.2, 730.1, 728.1
See application file for complete search history.

(56) References Cited

U.S. PATENT DOCUMENTS

| | | | | |
|---|---|---|---|---|
| 4,186,941 A * | 2/1980 | Scholz et al. | ............ | 280/743.1 |
| 5,073,418 A * | 12/1991 | Thornton et al. | ............ | 428/34.9 |
| 5,333,903 A * | 8/1994 | Eyrainer et al. | ............ | 280/743.1 |
| 5,362,101 A * | 11/1994 | Sugiura et al. | ............ | 280/743.2 |
| 6,161,864 A * | 12/2000 | Heilig | ................. | 280/728.2 |
| 6,361,072 B1 * | 3/2002 | Barnes | .................... | 280/743.1 |
| 6,435,554 B1 | 8/2002 | Feldman | | |
| 6,517,103 B1 * | 2/2003 | Schneider | ................ | 280/730.1 |
| 6,916,039 B2 | 7/2005 | Abe | | |
| 7,226,077 B2 | 6/2007 | Abe | | |
| 7,393,011 B2 * | 7/2008 | Keshavaraj | ............... | 280/743.2 |
| 7,434,837 B2 * | 10/2008 | Hotta et al. | ............... | 280/743.2 |
| 7,452,002 B2 * | 11/2008 | Baumbach et al. | ........ | 280/743.2 |
| 7,566,070 B2 * | 7/2009 | Miyata | ..................... | 280/730.1 |
| 2004/0150197 A1 * | 8/2004 | Iijima et al. | .............. | 280/730.1 |
| 2004/0207189 A1 * | 10/2004 | Miyata | ..................... | 280/743.2 |
| 2005/0040627 A1 * | 2/2005 | DePottey et al. | ......... | 280/730.1 |
| 2005/0052009 A1 * | 3/2005 | Abe | ......................... | 280/743.1 |
| 2005/0151351 A1 * | 7/2005 | Enders et al. | ............. | 280/730.1 |
| 2005/0206138 A1 * | 9/2005 | Breuninger et al. | ......... | 280/729 |
| 2007/0090632 A1 * | 4/2007 | Kashiwagi | ............... | 280/730.1 |
| 2007/0090634 A1 * | 4/2007 | Jang et al. | ................. | 280/730.2 |
| 2007/0200320 A1 * | 8/2007 | Keshavaraj | ............... | 280/730.1 |
| 2007/0222189 A1 * | 9/2007 | Baumbach et al. | ........ | 280/730.1 |
| 2008/0116669 A1 * | 5/2008 | Adachi et al. | ............. | 280/730.1 |

FOREIGN PATENT DOCUMENTS

DE     19730397     10/1998

(Continued)

*Primary Examiner*—Paul N Dickson
*Assistant Examiner*—Drew Brown
(74) *Attorney, Agent, or Firm*—Tarolli, Sundheim, Covell & Tummino LLP

(57) ABSTRACT

A vehicle occupant restraint device has a gas bag module with a housing and a gas bag having a free exit end, the gas bag moving into its fully deployed position with the free exit end first. At least one control element is provided which engages the gas bag and forces the gas bag to extend generally in an arc shape from the housing up to the free exit end in the deployed state.

15 Claims, 8 Drawing Sheets

FOREIGN PATENT DOCUMENTS

| | | |
|---|---|---|
| DE | 19738203 | 3/1999 |
| DE | 19749585 | 5/1999 |
| DE | 19900592 | 7/2000 |
| DE | 19946477 | 3/2001 |
| DE | 10155857 | 5/2002 |
| DE | 202004018987 | 9/2005 |
| DE | 602004002164 | 12/2006 |
| DE | 60305374 | 5/2007 |

* cited by examiner

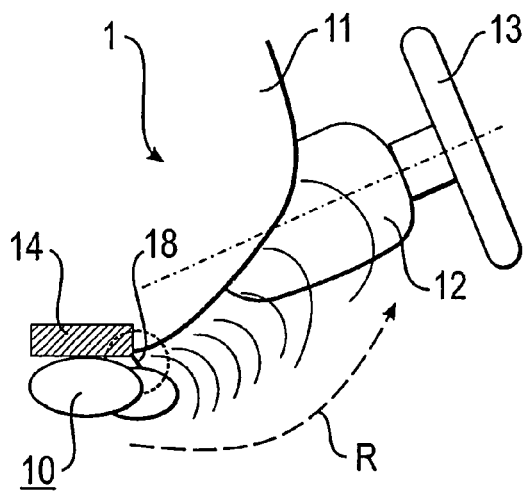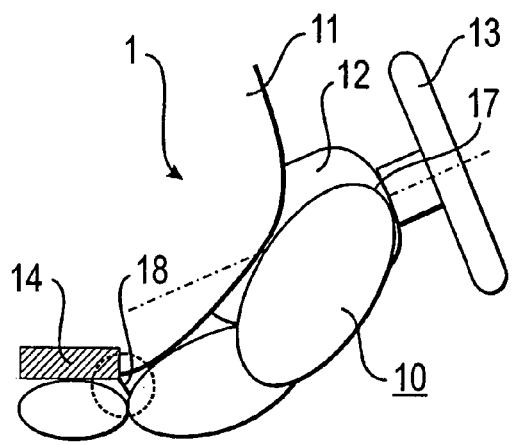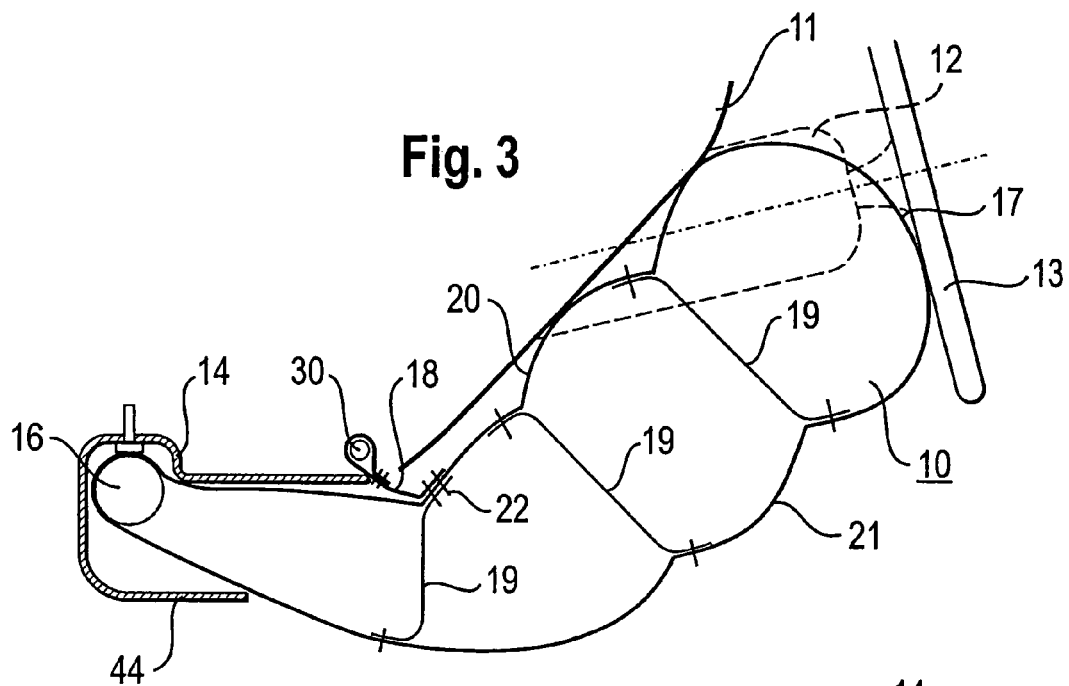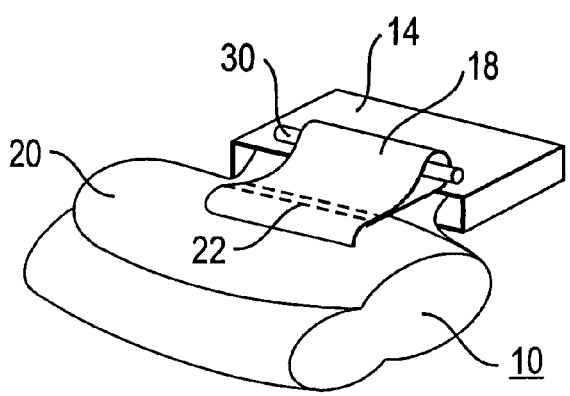

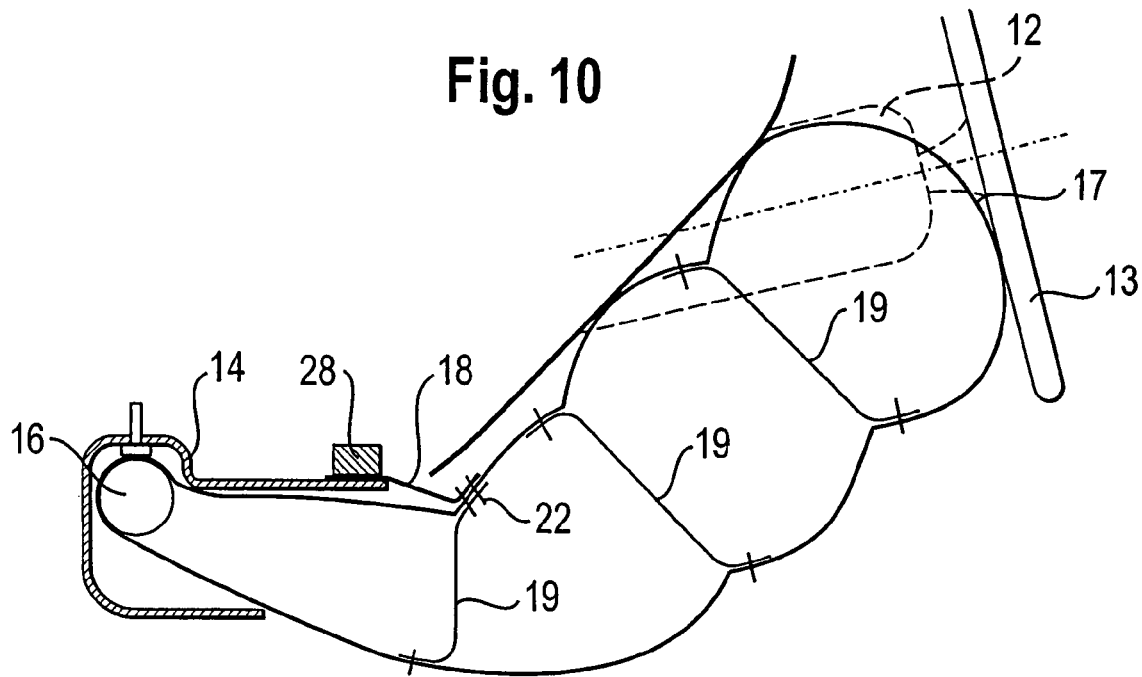
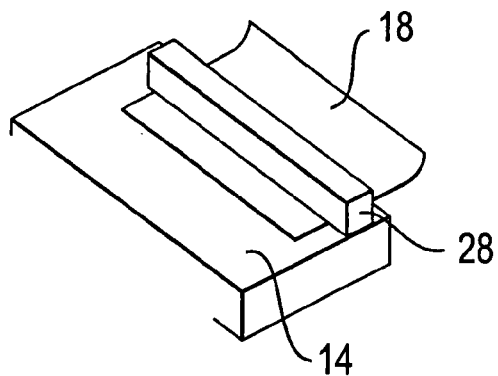
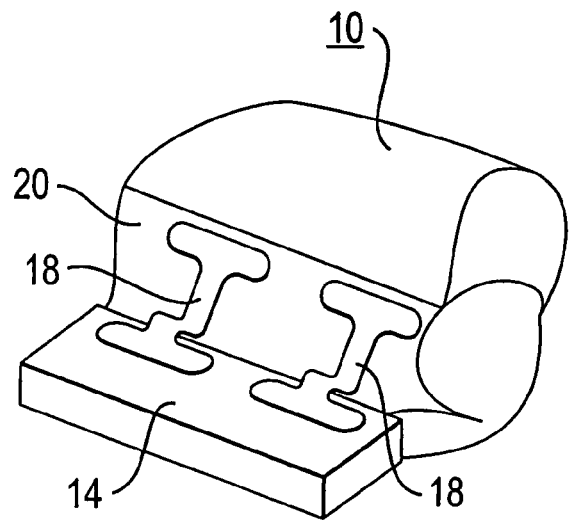

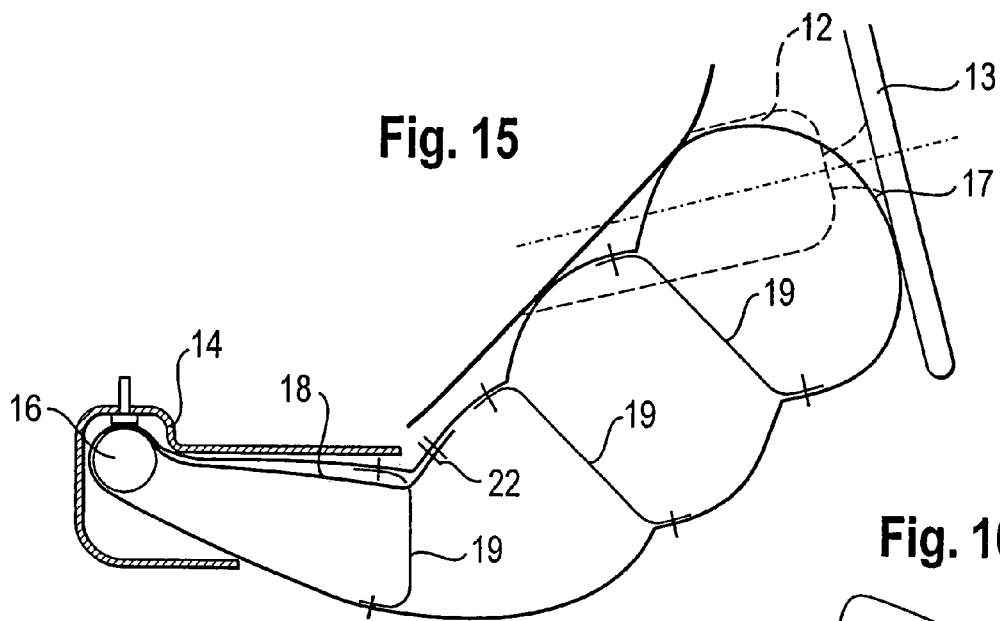
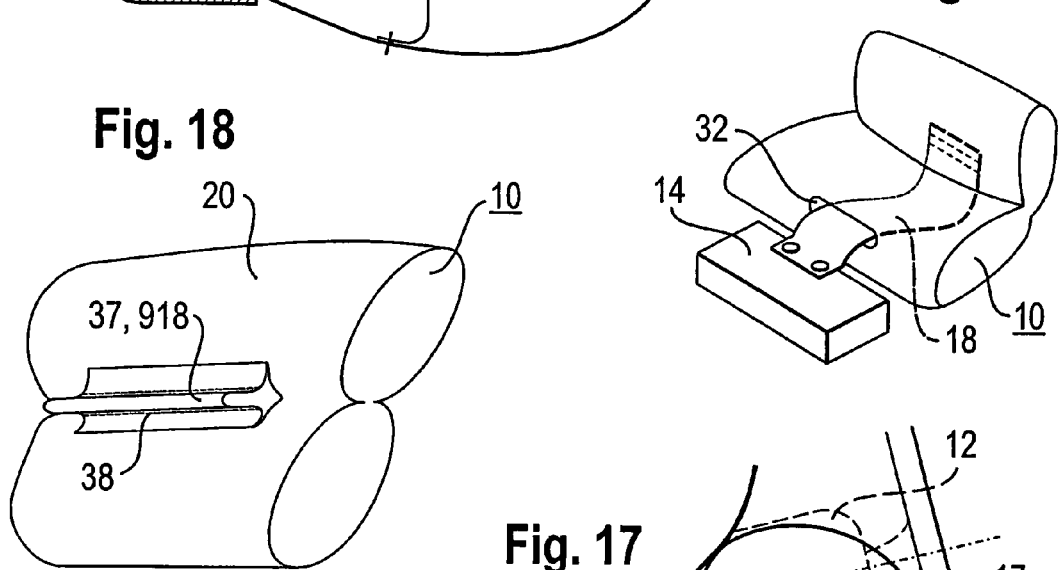
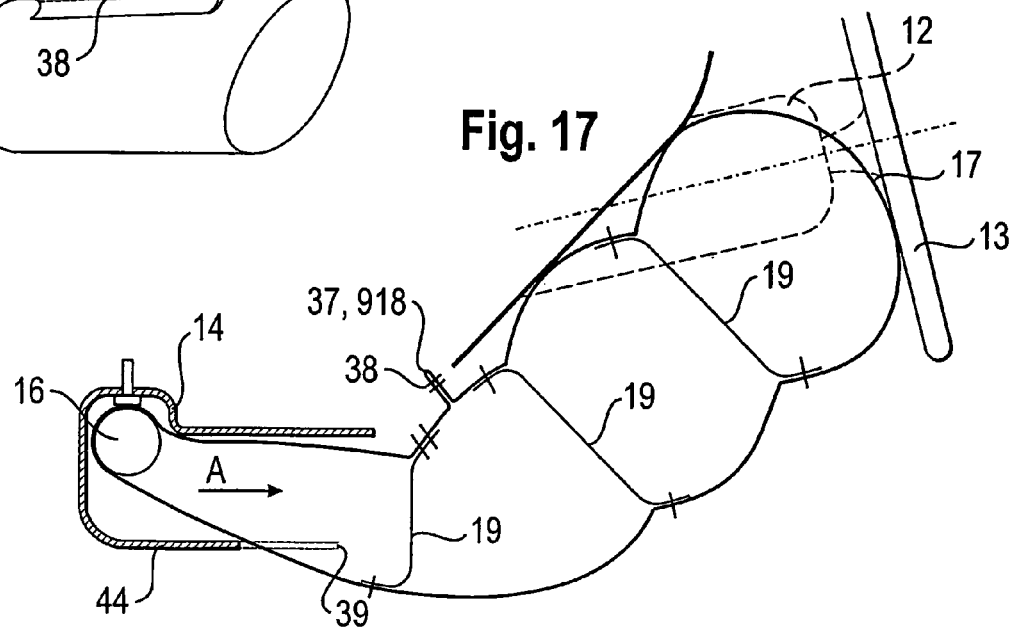

Fig. 19
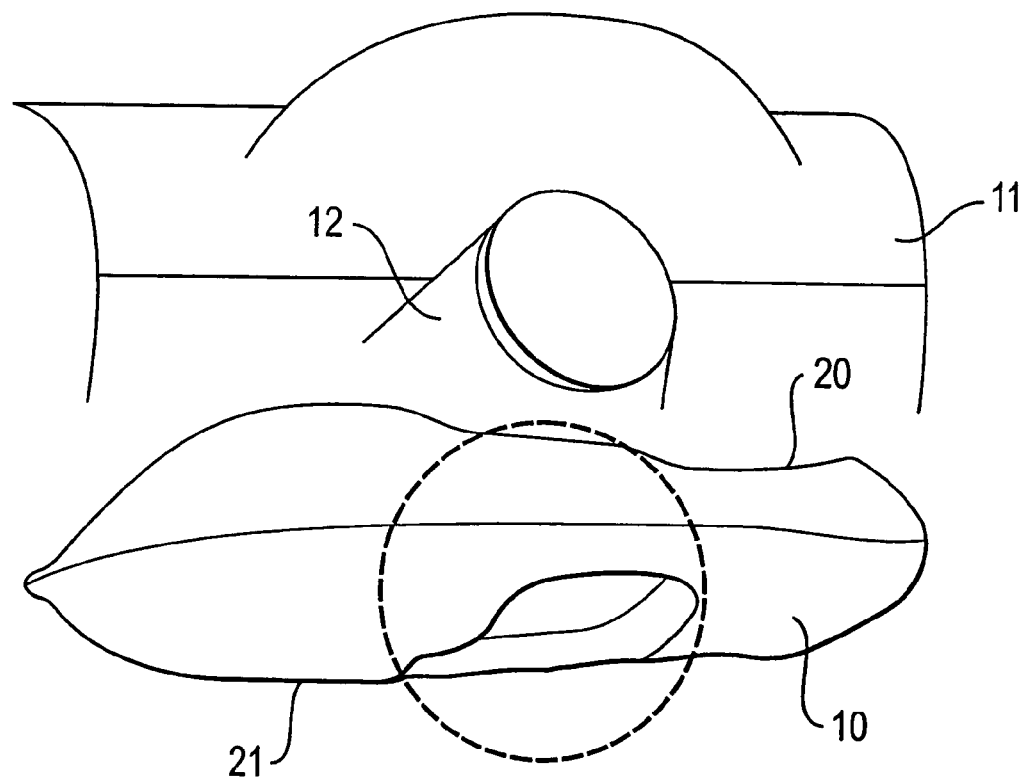
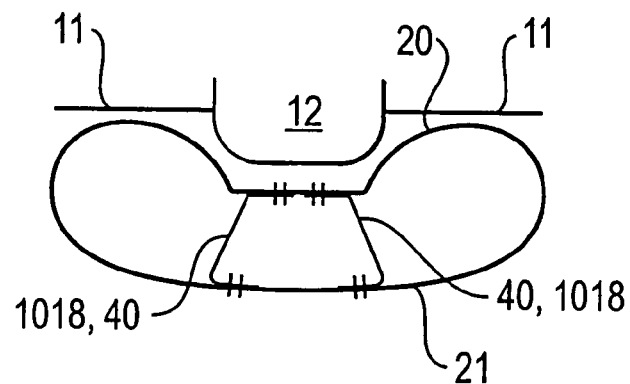
Fig. 20
Fig. 21
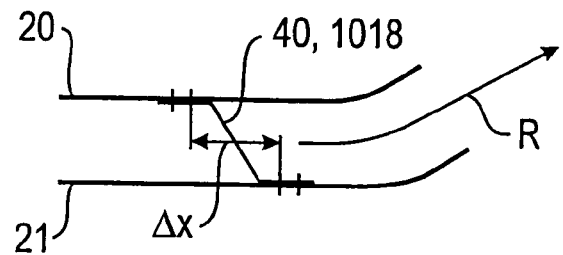

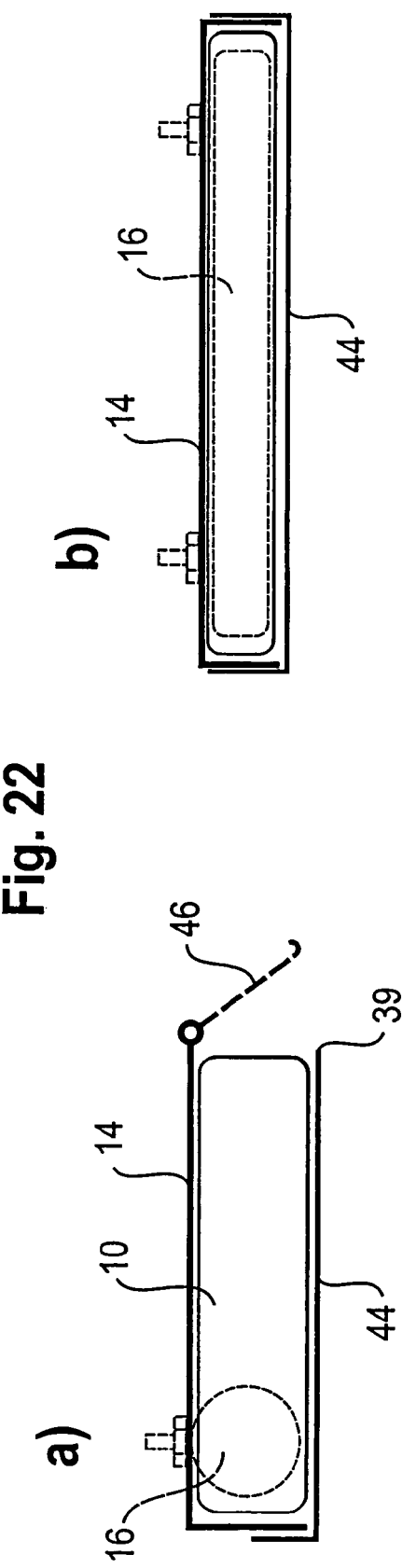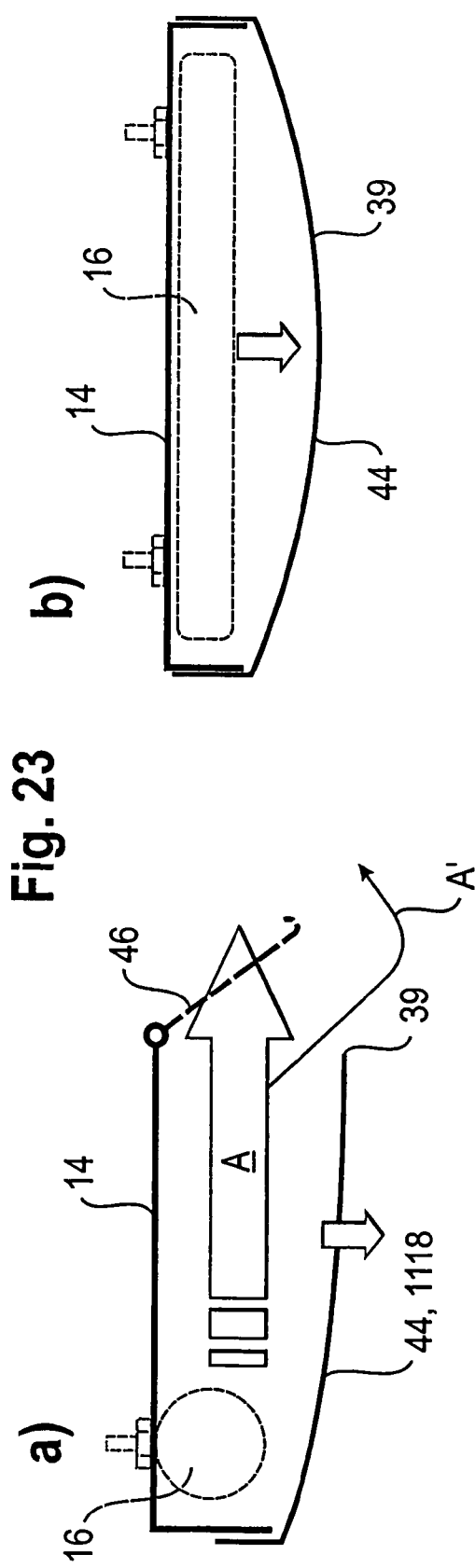

VEHICLE OCCUPANT RESTRAINT DEVICE COMPRISING A GAS BAG

FIELD OF THE INVENTION

The invention relates to a vehicle occupant restraint device comprising a gas bag.

BACKGROUND OF THE INVENTION

Gas bags are provided in vehicles for the protection of vehicle occupants during crash situations. It is important that they take up their inflated position as fast as possible, even if the gas bag module has to be arranged in an inconvenient position due to the design of the vehicle.

BRIEF SUMMARY OF THE INVENTION

It is an object of the invention to position a gas bag optimally in relation to an occupant or a vehicle contour.

To achieve this object, a vehicle occupant restraint device has a gas bag module with a housing and a gas bag having a free exit end, the gas bag moving into its fully deployed position with the free exit end first. At least one control element is provided which engages the gas bag and forces the gas bag to extend in the deployed state generally in an arc shape from the housing up to the free exit end. The control element can also affect the deploying motion of the gas bag, such that the deploying motion proceeds in an arc shape and the direction of motion of the front part of the gas bag thus varies during deployment.

The invention is particularly suitable if the deployment takes place at least partially opposite to the direction of the gravitational force, i.e. upwards, as can be the case for example in knee protection gas bags. The invention is particularly advantageous for gas bag modules in which the gas bag is not deployed directly towards the body part that needs to be restrained but in which the gas bag, in particular its free, front exit end describes, so to speak, a curve during deployment.

In a preferred embodiment of the invention, the control element is a limiting strap.

The control element preferably engages a rear-side shell part of the gas bag.

The control element can for example be formed by a limiting strap engaging the rear-side shell part and a front-side shell part of the gas bag, the fastening points of the limiting strap being offset with respect to each other in the deployment direction of the gas bag.

In a variant, the control element engages a vehicle-fixed component, forming for example an abutment about which the gas bag pivots during deployment. This arrangement further contributes to the fact that the gas bag is held in its shape and position in the deployed state.

The fastening of the control element to the vehicle-fixed component can be realized in any suitable manner.

A loop of the control element can for example be secured to the vehicle-fixed component.

Hooks for securing the control element can also be provided on the vehicle-fixed component.

Alternatively, the control element can be clamped to the vehicle-fixed component.

It is also possible to secure the control element to the vehicle-fixed component by means of a screw connection.

An essentially rigid fastening part which is preferably secured directly to the vehicle-fixed component can also be arranged inside or outside the gas bag as a control element.

According to a variant, the control element is arranged completely outside the gas bag.

According to a further variant, at least some portion of the control element extends inside the gas bag.

Several control elements which may also differ from each other, can be provided. These can be used alternatively or additionally to the control element types described so far.

It is, e.g., possible to provide a control element which is formed by a dart in the rear-side shell part of the gas bag.

Limiting straps connecting the rear-side shell part and the front-side shell part of the gas bag to each other, which are arranged in the region of a vehicle contour and which adapt the shape of the gas bag to the vehicle contour can also be provided as control elements.

In an embodiment of the invention, a housing is provided for receiving the folded gas bag, and the housing has a bottom which bulges when the gas bag exits the housing. Particularly in very flat housing shapes, this permits a purposeful absorption of the forces occurring during deployment.

The bottom and an edge of the bottom delimiting an exit opening can also be used to transmit to the gas bag, in the initial stage of its deployment, an impulse from this face that may be upwards directed, opposite to the gravitational force. In subsequent stages of the deployment, the gas bag can be supported by the bottom and can for example thus obtain its curved shape more rapidly. The bottom is thus to be considered to be a control element, too.

According to the invention, control elements giving the shape or controlling the motion and which support the gas bag such that it assumes a predetermined position and/or a predetermined shape during its deployment are provided. The control elements can engage both the gas bag and vehicle-fixed components but can also be provided only on the gas bag. Here, the control elements can be arranged both inside the gas bag and on the outside of the gas bag.

The control elements can be shape-determining control elements arranged inside the gas bag or on the gas bag and which permit an adaptation of the shape of the gas bag in three dimensions. In the inflated state, the gas bag can thus be adapted to the contour of e.g. an adjoining lining part. Furthermore, it can also be held opposite to the gravitational force in a predetermined position, for example resting on the lining part.

The control elements can also have a motion controlling effect by means of which during the deployment, the gas bag follows a curved line, for example avoiding an interfering vehicle contour.

Several identical or different control elements can be combined in order to obtain a desired specific effect as to the shape and the course of the deployment of the gas bag.

The invention can be used for gas bags in all positions in a vehicle, for example for knee protection gas bags, side gas bags, in particular those which deploy from a back rest of a vehicle seat, or for front gas bags for the driver and the passenger.

BRIEF DESCRIPTION OF THE DRAWINGS

FIG. 1 shows a schematic representation of a vehicle occupant restraint device according to the invention during the deployment of the gas bag;

FIG. 2 shows the vehicle occupant restraint device of FIG. 1 with the gas bag fully deployed;

FIG. 3 shows a schematic sectional view of a first embodiment of a vehicle occupant restraint device according to the invention;

FIG. 4 shows a detail of the vehicle occupant restraint device of FIG. 3 in a perspective view;

FIG. 10 shows a schematic sectional view of a fourth embodiment of a vehicle occupant restraint device according to the invention;

FIG. 11 shows the vehicle occupant restraint device of FIG. 10 in a perspective view;

FIG. 12 shows a schematic and perspective sectional view of a fifth embodiment of a vehicle occupant restraint device according to the invention;

FIG. 15 shows a schematic sectional view of a seventh embodiment of a vehicle occupant restraint device according to the invention;

FIG. 16 shows a perspective view of a eighth embodiment of the vehicle occupant restraint device according to the invention;

FIG. 17 shows a schematic sectional view of a ninth embodiment of a vehicle occupant restraint device according to the invention;

FIG. 18 shows the vehicle occupant restraint device of FIG. 17 in a perspective view;

FIG. 19 shows a schematic and perspective view of a tenth embodiment of a vehicle occupant restraint device according to the invention;

FIG. 20 shows the vehicle occupant restraint device of FIG. 19 in a schematic sectional view;

FIG. 21 shows a schematic sectional view of a detail of a vehicle occupant restraint device according to the invention, in which a control element is arranged with an offset in the gas bag;

FIGS. 22a and 22b show two different views of a housing of a vehicle occupant restraint device according to the invention before the deployment of the gas bag; and FIGS. 23a and 23b show two different views of the housing of FIG. 22 during the deployment of the gas bag.

DETAILED DESCRIPTION OF PREFERRED EMBODIMENTS

Figure 5:
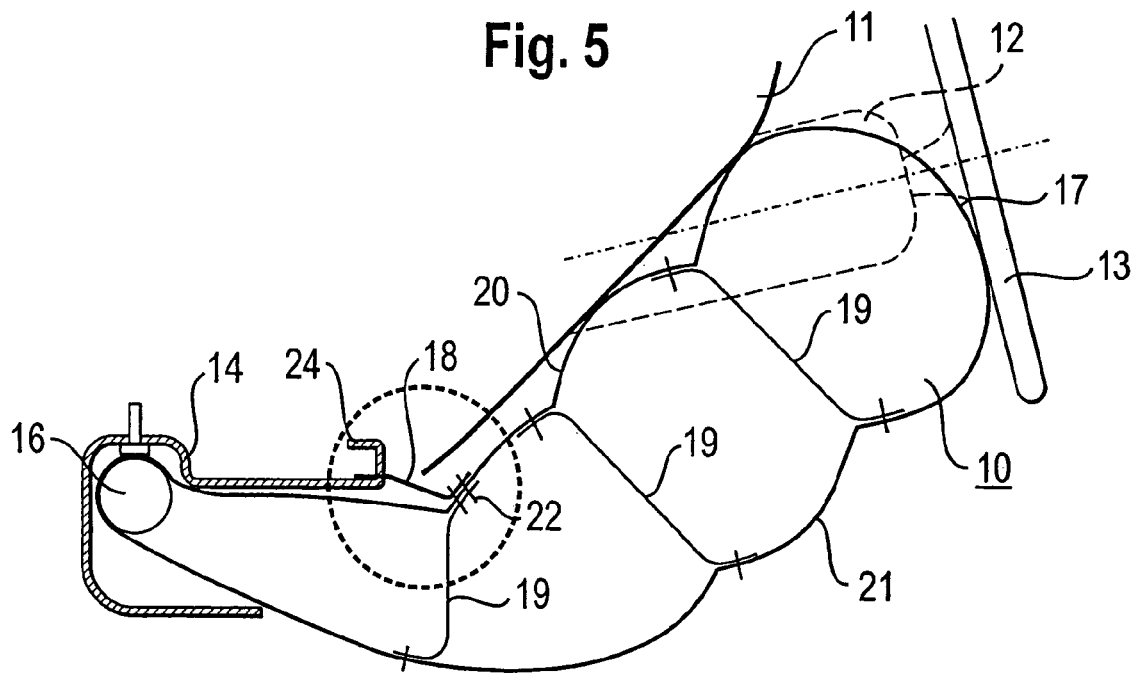
FIG. 5 shows a schematic sectional view of a second embodiment of a vehicle occupant restraint device according to the invention.

The figures represent a vehicle occupant restraint device 1 comprising a gas bag module and in which a knee protection gas bag is shown as an example for all gas bag types which can be used.

FIGS. 1 and 2 show the functional principle of the invention. FIG. 1 shows the vehicle occupant restraint device 1 during the deployment of its gas bag 10, and FIG. 2 shows the fully deployed gas bag 10 in its final position in which its rests against a vehicle contour.

Prior to its deployment, the gas bag 10 is received in a folded state in a housing 14, below a dashboard 11, here also below a steering wheel 13 and a steering column lining 12. The housing 14 could also be reduced to a supporting or fastening element for fixing the gas bag module to a vehicle-fixed component.

When the gas bag 10 is actuated, it is inflated by gas discharged from a gas generator 16 which is fastened to the housing 14 by means of threaded bolts projecting from the gas generator 16. The gas bag then deploys out of the housing 14 into the position shown in FIG. 2, a free, front exit end 17 leading its motion.

The aim is to protect the legs of the vehicle occupant and to obtain a stabilization of the position of the vehicle occupant by means of the gas bag 10.

The housing 14 is arranged at some distance below the highest point of the deployed gas bag 10, which is approximately coincident with the free exit end 17 of the gas bag 10. In its fully deployed state, the gas bag 10 has a three-dimensional shape curved upwards in an arc shape (cf. FIG. 2, for example). Due to this shape, the gas bag rests against the vehicle contour of the dashboard 11, which also extends in a curve.

The curvature of the dashboard 11 and of the steering column lining 12, respectively, has the effect that the gas bag 10 can not deploy in a direct line. Apart from its curved shape, the deployment direction R of the gas bag 10 is not in a straight line, either, but also extends upwards in an arc shape (cf. FIG. 1).

The three-dimensional curved shape as well as the curved deploying motion are determined, along with other parameters, by one or more control elements 18, 618, 918, 1018, 1118. Each control element 18, 618, 918, 1018, 1118 has an effect determining the shape, the position and/or the direction of the gas bag 10 and is arranged inside and/or on the outside of the gas bag 10 and of the housing 14, respectively.

The control element 18 serves to obtain, during deployment, an upwardly directed movement of the gas bag 10 and a curvature towards a rear-side shell part 20 of the gas bag 10 by shortening and retaining, respectively, the rear-side shell part 20 of the gas bag 10.

Additionally to the control element(s) 18, the gas bag 10 shown is structured with known limiting straps 19 which are arranged in its interior, each extending between the rear-side shell part 20 and a front-side shell part 21 and being sewn to the shell parts 20, 21 or fastened in any other suitable manner.

In the first embodiment shown in FIGS. 3 and 4, the control element 18 is formed by a limiting strap which is arranged completely outside the gas bag 10.

One end of the limiting strap engages the rear-side shell part 20 of the gas bag 10 and the other end engages a vehicle-fixed component, for example the dashboard 11, the steering column lining 12, or in the present case, the outer surface of the housing 14. The engaging point on the vehicle-fixed component forms a pivoting point about which the gas bag 10 pivots during its deployment. The control element 18 further holds the gas bag 10 in its intended deployed position.

The free length of the limiting strap between its engaging point on the rear-side shell part 20 and the fastening to the housing 14 is preferably relatively short and is of course adapted to the respective purpose of use and the geometry of the place of installation. The length is chosen such that in the inflated state, the gas bag 10 is held as close as possible to the vehicle contour to be covered.

The control elements 18 shown in FIGS. 3 to 12 each engage the rear-side shell part 20 at a point which, seen from the housing 14, is arranged approximately on a third of the deployed length of the gas bag 10 and is firmly connected to the gas bag 10. The connection is preferably realized by one or more seam(s) 22. The position of the engaging point can of course be adapted to the respective circumstances by a person skilled in the art.

The control element(s) 18 is/are at least partially folded together with the gas bag 10 and are arranged in the module housing 14 before the gas bag 10 unfolds.

The control element 18 consists for example of a fabric strip which can be made of the same material as the gas bag 10. It is also possible to manufacture the control element 18 of other materials such as films, plastic strips or metal sheets in a rigid or flexible form.

The driver-side end of the control element 18 represented in FIGS. 3 and 4 forms a loop across the entire width of the control element 18, through which a fastening element 30 such as a rod is engaged, which in turn is fastened to the housing 14.

Figure 6:
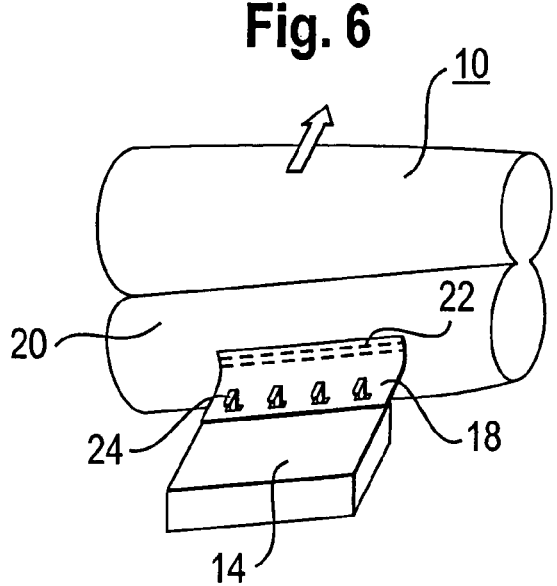
FIG. 6 shows the vehicle occupant restraint device of FIG. 5 in a perspective view.

In the second embodiment shown in FIGS. 5 and 6, several adjacent hooks 24 are provided on the vehicle-fixed component, here on the housing 14, the hooks being directed opposite to the extending direction of the control element 18 and tabs in the control element 18 being pulled over these hooks in order to fix the control element 18 to the housing 14.

Figure 7:
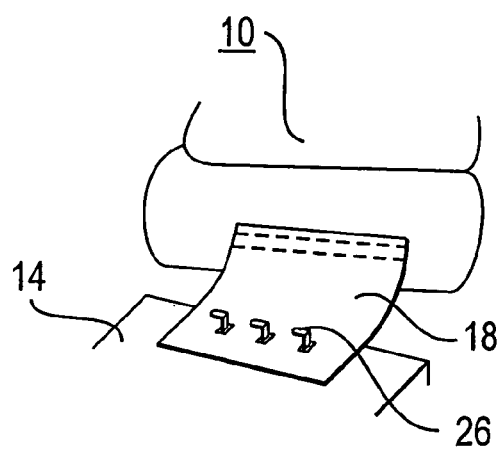
FIG. 7 shows a variant of the vehicle occupant restraint device of FIGS. 5 and 6 in a perspective view.

In the example shown in FIG. 7, the tabs of the control element 18 are pulled over several adjacent hooks 26 on the vehicle-fixed component, here on the housing 14, the hooks projecting transversely to the extending direction of the control element 18.

Figure 8:
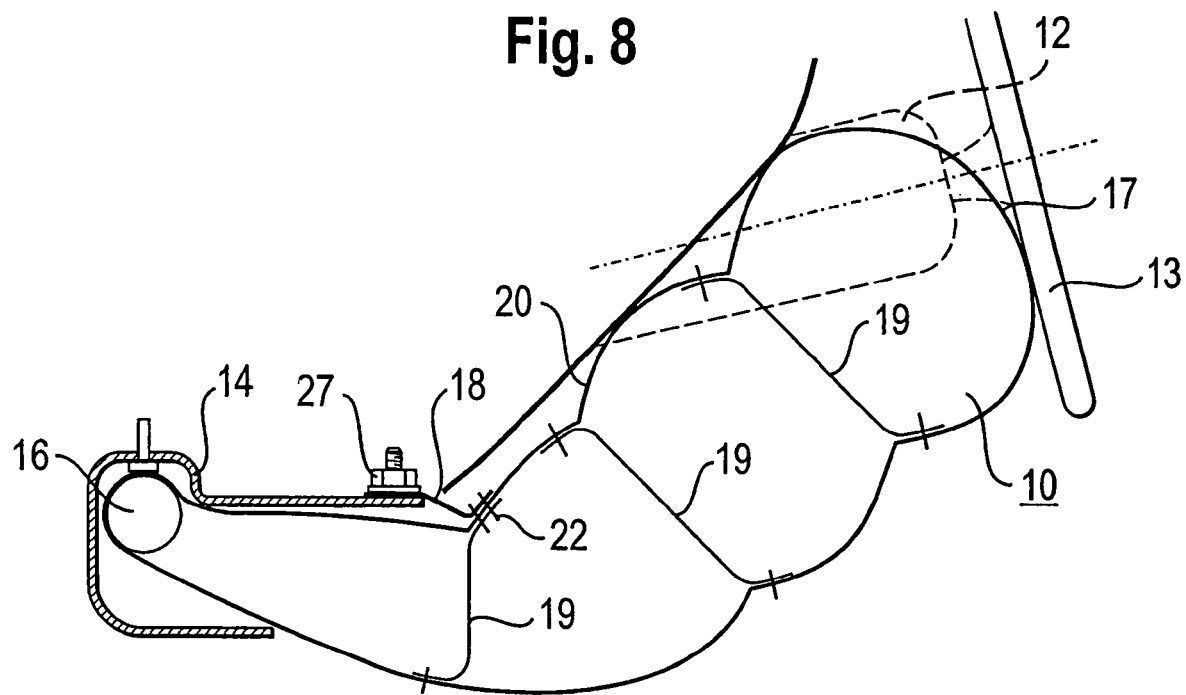
FIG. 8 shows a schematic sectional view of a third embodiment of a vehicle occupant restraint device according to the invention.
Figure 9:
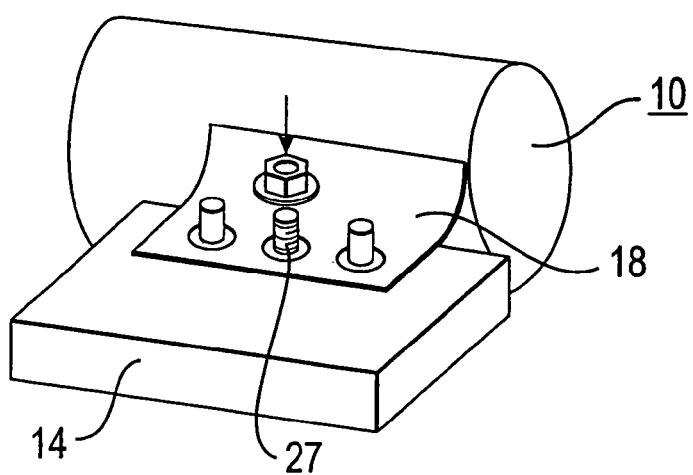
FIG. 9 shows the vehicle occupant restraint device of FIG. 8 in a perspective view.

In the third embodiment shown in FIGS. 8 and 9, the control element 18 is screwed to the vehicle-fixed component, here the housing 14, via a screw connection 27.

FIGS. 10 and 11 show a fourth embodiment in which the driver-side end of the control element 18 is clamped between the vehicle-fixed component, here the housing 14, and a separate clamping ledge 28 extending across the entire width of the gas bag 10.

In the examples shown here, the width of the control element 18 approximately corresponds respectively to the half up to two thirds of the width of the gas bag 10 in the lower third of the gas bag 10.

FIG. 12 shows in a fifth embodiment the use of two separate control elements 18 arranged parallel to each other and next to each other. Both control elements 18 engage, on the one hand, the rear-side shell part 20 of the gas bag 10 and, on the other hand, on the vehicle side the vehicle-fixed component. Compared with the diameter of the free region of the control element 18, the engaging points on the gas bag 10 and on the vehicle-fixed component are increased in width, whereby a higher flexibility of the control element 18 is obtained.

It is conceivable to form the control elements 18 with different lengths in order to permit a further adaptation of the three-dimensional shape of the gas bag 10.

Figure 13:
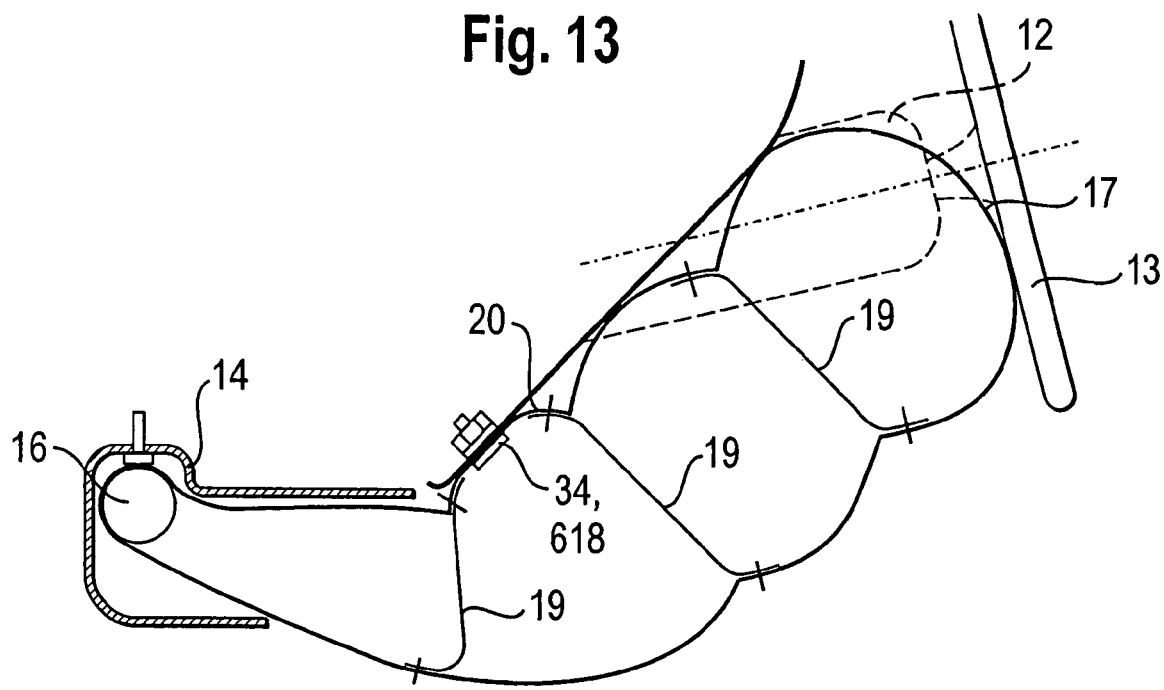
FIG. 13 shows a schematic sectional view of a sixth embodiment of a vehicle occupant restraint device according to the invention.
Figure 14:
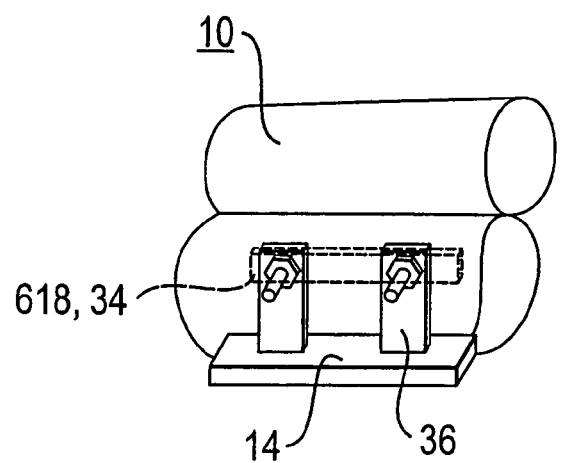
FIG. 14 shows a detail of the vehicle occupant restraint device of FIG. 13 in a perspective view.

FIGS. 13 and 14 show in a sixth embodiment a further possibility to influence the three-dimensional shape of the gas bag 10. In this case, the rear-side shell part 20 of the gas bag 10 is connected, directly to the vehicle-fixed component, in this case screwed, by means of a control element 618 arranged inside the gas bag 10 that is configured as a fastening part 34 and more specifically as a rigid plate.

The fastening part 34 is for example a metal sheet. As indicated in FIG. 14, it is also possible to mount flexible or rigid supports 36 to the vehicle-fixed component and to arrange the fastening part 34 on the rear-side shell part 20 of the gas bag 10. The fastening part 34, in turn, is screwed to the free ends of the support 36. It is of course possible to use different fastenings.

The control element 18 can extend completely in the interior of the gas bag 10, as shown in FIG. 15 which represents a seventh embodiment. The end of the control element 18 is mounted to the housing 14 so as to be vehicle-fixed by means of the fastening of the gas generator 16, in the example shown by means of a threaded bolt.

In an eighth embodiment (FIG. 16), the control element 18 is fastened in the interior of the gas bag 10 and projects through an opening 32 of the gas bag 10 to the outside, where it is again fastened to the vehicle-fixed component, here to the housing 14, in a suitable manner. The opening 32 is arranged as close as possible to the housing 14.

A further possibility to obtain a curved shape of the gas bag 10 is to gather a part of the rear-side shell part 20 of the gas bag 10 according to a ninth embodiment shown in FIGS. 17 and 18, and to fix the fabric fold thus produced as darts 37 by seams 38 or other suitable means. Here, the dart 37 functions as a control element 918 and remains fixed by the seams 38 preferably during the entire deploying and retaining process. In the example represented, only one dart 37 is formed, but it is also possible to provide several darts 37.

A bottom 44 of the housing 14 also has a supporting effect such that the gas bag 10 is directed upwards and rapidly stabilized in its upwardly curved position. It is advantageous if the lower edge 39, as indicated in a dotted line in FIG. 17, is pulled far forward in an exit direction A of the gas bag 10 so that in an initial deployment stage, the gas bag 10 is subjected to an upwardly directed impulse by the bottom 44. In the inflated state, the gas bag 10 is further supported by the bottom 44 and its front edge 39. The exact position of the front edge 39 must of course be adapted by a person skilled in the art to the respective purpose of use.

Limiting straps 40 arranged inside the gas bag 10 represent, according to a tenth embodiment, a further form of shape and motion controlling control elements 1018 by means of which it is possible, alternatively or additionally to the variants described so far, to affect the three-dimensional shape of the gas bag 10 and its behaviour during the deployment. For this purpose, one or more limiting straps 40 are provided which connect the rear-side shell part 20 to a front-side shell part 21. Variants thereof are shown in FIGS. 19 to 21.

In order to form a recess for the steering column lining 12, a structure composed of two limiting straps 40 is provided in the example shown in FIGS. 19 and 20, the ends of which are respectively arranged offset with respect to each other by a certain amount so that, seen in section, the two limiting straps 40 are diverging. In the region of the steering column lining 12, i.e. on the rear-side shell part 20, the fastening points of the limiting straps 40 are closer to each other than on the front-side shell part 21. This leads to a curvature of the gas bag 10 around the steering column lining 12 forming an interfering contour. The curvature is approximately transversely to the extension direction of the limiting straps 40 and to the deployment direction R.

In FIG. 21, the fastening points of the ends of the limiting strap 40 on the rear-side and the front-side shell part 20 and 21, respectively, are arranged offset with respect to each other by an amount of $\Delta x$. The offset is realized in the direction R of the deployment of the gas bag 10. The free length of the limiting strap 40 inside the gas bag 10 and the offset $\Delta x$ have to be adapted to the respective purpose of use. The limiting strap 40 can be fixed to the shell parts 20, 21 e.g. by means of seams.

Such limiting strap structures comprising limiting straps 40 with or without offset ends can also be arranged at a different point in the gas bag 10 to accordingly determine, along with other parameters, the three-dimensional shape thereof.

The limiting straps 40 can also partially constrict the gas bag 10 (FIG. 20). The depth of the gas bag 10 may be affected by the length of the limiting straps 40, which of course also has an effect on three-dimensional shape of the gas bag 10.

FIGS. 22 and 23 show the behaviour of the housing 14 during the deployment of the gas bag 10. As can be seen e.g. in FIG. 3, the housing 14 is arranged below the dashboard 11. In the examples shown, the housing 14 is fastened to the bottom surface of the dashboard 11 by means of lateral tabs (not shown). The fastening could also be realized by means of threaded bolts projecting from the gas generator 16. At this place, a relatively small installation space in the vehicle is at disposal, since space has to be provided for the steering column lining 12 and for the legs of the vehicle occupant. In the direction towards the vehicle interior, the housing 14 is thus kept very flat. This leads to the fact that the gas bag 10 is folded to an elongated package, as can be seen in FIG. 22a. The exit direction A is directed to one of the small faces of the housing 14, as shown in FIG. 23a. In order to absorb the forces acting during the deployment of the gas bag 10, a bottom 44 of the housing 14 is configured such that it bulges when the gas bag 10 unfolds, as indicated in FIGS. 23a and 23b. The bottom 44 and the opposite top surface of the housing 14 serve as a deployment channel for the gas bag 10. The exit direction A thus corresponds to the initial deployment direction R which is deflected upwards in an arc shape during the deployment. Despite the deformation, the bottom 44 transmits an upwardly directed impulse to the gas bag 10 during the exit stage and also has the effect of a supporting face for the inflated gas bag 10. The bottom 44 and its edge 39 delimiting the exit opening thus have the effect of a control element 1118 for affecting the gas bag 10 (FIG. 23a).

In a variant (shown in a dotted line in FIGS. 22a and 23a), the housing 14 is initially partially or completely closed by a flap 46. The flap 46 can for example form a visible edge of the dashboard 11. When the gas generator 16 is actuated, the gas bag 10 deploys around the lower edge of the flap 46 and has an arc shaped exit direction A'. The exit opening for the gas bag 10 is realized or enlarged by the yielding of the bottom 44. The rest of the housing 14 can remain essentially without deformation. The flap 46 can then remain rigidly in its position or can be pushed open to a certain degree by the gas bag 10.

The bottom 44 of the housing 14 can be made of metal, plastic or of a fabric layer.

Due to the means used for controlling the gas bag unfolding and for positioning the inflated gas bag, it is possible to make the exit opening and the exit direction of the gas bag 10 independent, to a certain extent, of the final deployed position of the gas bag 10 in the vehicle. It is for example possible, as shown in FIG. 1, to direct the exit opening obliquely downwards while the completely deployed gas bag 10 extends obliquely upwards in an arc shape. During its deployment, the gas bag 10 moves in an arc shape around the lower edge of the dashboard 11 upwards in its final position in front of the legs of the vehicle occupant. The shaping of the gas bag 10 further assists in bypassing or excluding the steering column lining 12.

This is achieved by means of control elements 18, 618, 918, 1018, 1118 which for example engage the rear-side shell part 20 of the gas bag 10 and determine, along with other parameters, the shape, the position and the motion of the gas bag 10.

The gas bag 10 is fixed only to the housing 14 and, via the engaging point of the control element 18, to the vehicle-fixed component (in this case also the housing 14). The main part of the gas bag 10 "stands" freely in space. The position of the gas bag 10 and its curved shape are mainly determined by the control element(s) 18, 618, 918, 1018, 1118.

Though only one control element is shown in the most embodiments, it is possible to use similar or different control elements 18, 618, 918, 1018, 1118 together. For this purpose, it is within the discretion of a person skilled in the art to combine, as desired, the features of the individual embodiments, relating for example to the fastening type or to the form of the control elements 18, 618, 918, 1018, 1118.

The invention claimed is:

1. A vehicle occupant restraint device with a knee restraining gas bag module comprising a housing (14) and a knee restraining gas bag (10) which has a free exit end (17), the gas bag moving into its fully deployed position with the free exit end first, whereby the deployment takes place at least partially opposite to the direction of the gravitational forces,
and at least one control element (18; 618; 918; 1018; 1118) which forces the gas bag (10) to extend generally in an arc shape from the housing (14) up to the free exit end (17) in the deployed state, wherein the at least one control element comprises a first control element formed by a dart in a rear shell part of the gas bag.

2. The vehicle occupant restraint device according to claim 1, wherein the at least one control element comprises a second control element (18) comprising a limiting strap.

3. The vehicle occupant restraint device according to claim 1, wherein the at least one control element comprises a second control element (18) that engages a rear-side shell part (20) of the gas bag (10).

4. The vehicle occupant restraint device according to claim 3, wherein the second control element (18) engages a front-side shell part (21) of the gas bag (10), the fastening points of the second control element (18) being offset with respect to each other in the deployment direction (R).

5. The vehicle occupant restraint device according to claim 1, wherein the at least one control element comprises a second control element (18) that connects a rear-side shell part (20) and a front-side shell part (21) of the gas bag (10) to each other and in that it is arranged in the region of a vehicle contour and adapts the shape of the gas bag (10) to the vehicle contour.

6. The vehicle occupant restraint device according to claim 1, wherein the at least one control element comprises a second control element (18) that engages a vehicle-fixed component.

7. The vehicle occupant restraint device according to claim 6, wherein a loop of the second control element (18) is secured to the vehicle-fixed component.

8. The vehicle occupant restraint device according to claim 6, wherein hooks (24; 26) are provided on the vehicle-fixed component for securing the second control element (18).

9. The vehicle occupant restraint device according to claim 6, wherein the second control element (18) is clamped to the vehicle-fixed component.

10. The vehicle occupant restraint device according to claim 6, wherein the second control element (18) is secured to the vehicle-fixed component by means of a screw connection (27).

11. The vehicle occupant restraint device according to claim 6, wherein an essentially rigid fastening part (34) secured to the vehicle-fixed component is arranged on the gas bag (10) as the second control element (618).

12. The vehicle occupant restraint device according to claim 1, wherein the at least one control element comprises a second control element (18; 618; 918; 1118) arranged completely outside the gas bag (10).

13. The vehicle occupant restraint device according to claim 1, wherein the at least one control element comprises a second control element, at least some portion of the second control element (18) extends inside the gas bag (10).

14. The vehicle occupant restraint device according to claim 1, wherein the housing (14) is provided for receiving the folded gas bag (10), the housing (14) having a bottom (44) which bulges when the gas bag (10) exits the housing (14).

15. The vehicle occupant restraint device according to claim 14, wherein the at least one control element comprises a second control element (1118) formed by the bottom (44).

* * * * *